Oct. 13, 1964  R. L. SMALL  3,152,479
BLAST FURNACE PROBE
Filed March 4, 1963
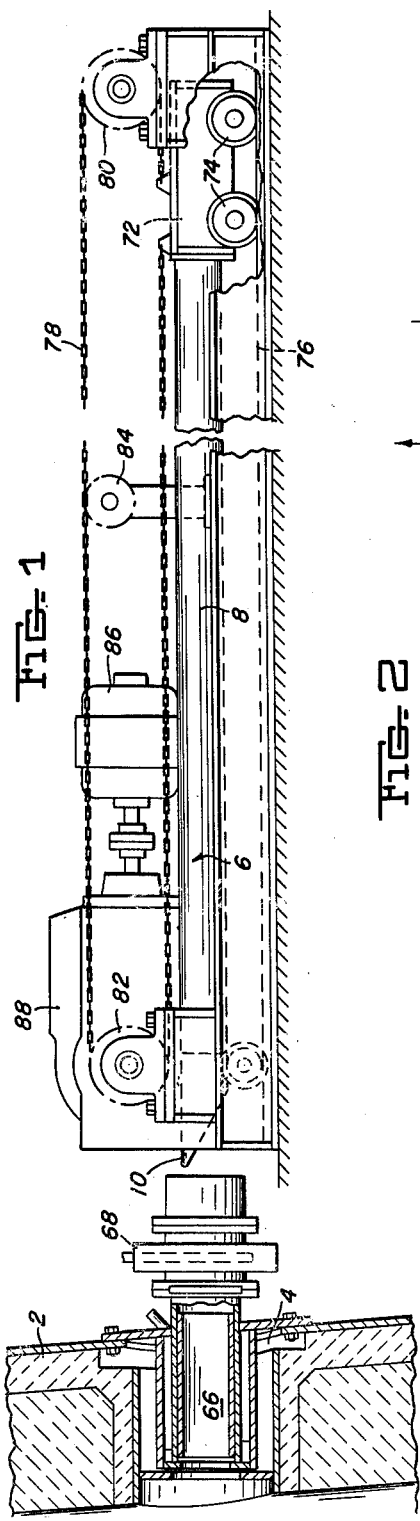
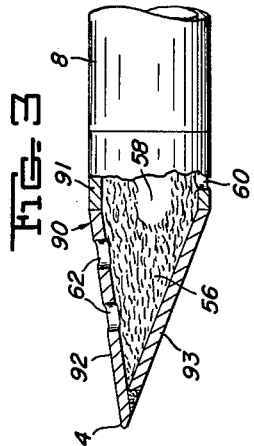
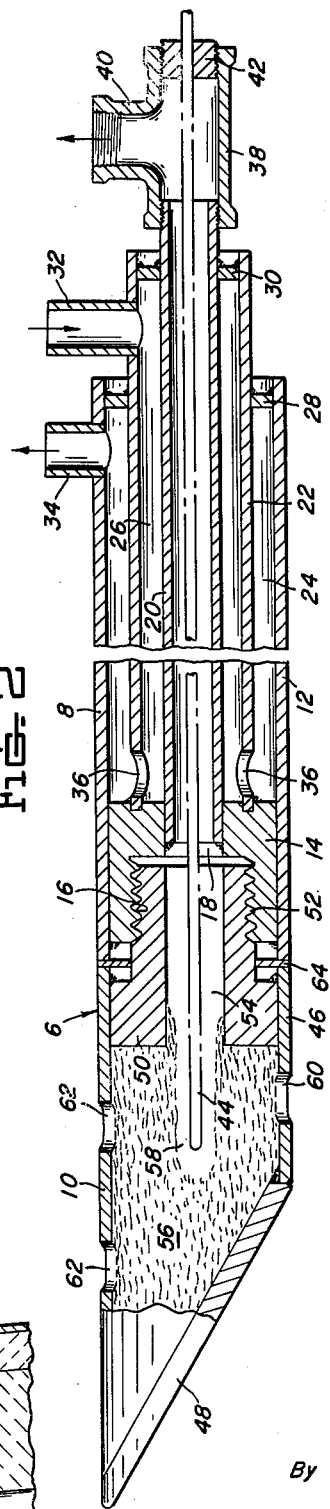
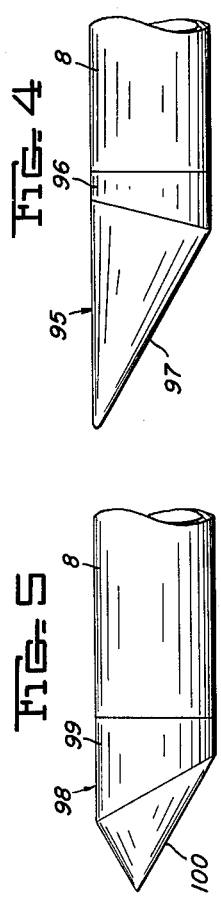
INVENTOR
RUSSELL L. SMALL
By Donald G. Dalton
Attorney

United States Patent Office 3,152,479
Patented Oct. 13, 1964

3,152,479
BLAST FURNACE PROBE
Russel L. Small, Plum Borough, Pa., assignor to United States Steel Corporation, a corporation of New Jersey
Filed Mar. 4, 1963, Ser. No. 262,785
6 Claims. (Cl. 73—421.5)

This invention relates to a blast furnace probe and more particularly to such a probe for insertion within the stack of an iron producing blast furnace in order to provide information relating to gas and solids distribution, gas analysis and temperatures. Some probes in use are fixed and others are movable into and out of the furnace. The fixed probes have many disadvantages so that it is desirable to use movable probes, but such probes also have not been completely satisfactory. The probe is often of cylindrical cross section and is provided near the furnace or forward end with a small opening to which a sampling tube is connected. The sampling tube extends through the rear end of the probe out of the furnace. The probe is forced through the furnace burden to a desired position and gas samples are withdrawn from the sampling tube and temperature measurements are obtained by means of a thermocouple extending to the end of the sampling tube. This is done at various positions along the diameter of the furnace. The probes of which I have knowledge tend to be forced downwardly by the movement of the furnace burden as they are moved therethrough. As the probe moves downwardly with the furnace burden, a point is reached at which further downward movement of the probe will cause it to fracture. This may occur before the gas and temperature sampling is completed along a particular level within the furnace. In such case the probe must be withdrawn before all the desired samplings are obtained.

It is therefore an object of my invention to provide a movable probe having an improved tip construction that permits it to be maintained within the furnace for a longer time and for further penetration than obtainable with probes of conventional design.

Another object is to provide such a probe having a tip construction that causes the probe to move upwardly as it is forced through the furnace burden.

Still another object is to provide such a probe which is economic to manufacture and maintain.

These and other objects will be more apparent after referring to the following specification and attached drawings, in which:

FIGURE 1 is a schematic elevational view, partly in section, of a probe and mechanism for moving it;

FIGURE 2 is a sectional view of the probe of my invention;

FIGURE 3 is a view, partly in section, showing a modification of the tip of the invention;

FIGURE 4 is a view in elevation of another form of tip of my invention; and

FIGURE 5 is a view in elevation of still another form of tip of my invention.

Referring more particularly to the drawings, reference numeral 2 indicates the wall of a blast furnace having an opening 4 therethrough for receiving the probe 6 of my invention. The probe 6 is preferably made of a body portion 8 and a separable tip portion 10. The body portion 8 includes an outer cylindrical tube 12 having an internally threaded member 14 welded or otherwise fastened thereto at its forward end. The member 14 is provided with female threads 16 at its forward end and an axial opening 18 through its rear end. An inner tube 20 is welded or otherwise secured to the member 14 within the opening 18 and an intermediate tube 22 is secured to the member 14 by welding or otherwise. A space 24 is provided between the tubes 12 and 22 and a space 26 between the tubes 20 and 22. The tube 22 extends beyond the rear end of the tube 12 and a closure member 28 extends between the rear end of the tube 12 and tube 22 so as to make a water tight joint. A similar closure member 30 is provided between the rear end of tube 22 and tube 20. A cooling water inlet 32 is provided into the space 26 and a cooling water outlet 34 is provided from the space 24. Openings 36 through the walls of tube 22 at the forward end thereof permit circulation of cooling water from the inlet 32, through spaces 26 and 24 and outlet 34. A T 38 is secured to the rear end of tube 20 and is provided with outlets 40 and 42. Outlet 40 is connected to gas analyzing equipment, not shown, and a thermocouple 44 passes through opening 42 and is connected to a temperature indicator, not shown.

The tip portion 10 includes a tube 46 having the same diameter as tube 12. The forward end of the tube 46 is cut at a bias with the upper side extending beyond the lower side thereof. A flat closure plate 48 extends upwardly and forwardly and is welded to the tube 46 to close the forward end thereof. Thus a tip is provided having its lead end offset upwardly from the longitudinal axis of the tube 46 so that as the probe advances inwardly into the furnace burden it displaces more material in the downward direction than in the upward direction. The tube 46 has a tubular member 50 welded to the rear end thereof. The member 50 has male threads 52 which engage the female threads 16. An opening 54 is provided through the member 50 in alignment with the tube 20. Stainless steel wool 56, or other filter medium, is provided within the tube 46 with an axial opening 58 being provided therein. The thermocouple 44 passes through opening 54 into opening 58. A gas entry slot or slots 60 are provided through the bottom of tube 46 and gas exit slots 62 are provided through the top thereof. The ends of the tubes 12 and 46 are in abutting relationship when the threads 16 and 52 are drawn up tight. If necessary a shim 64 may be inserted between the ends of the tubes 12 and 46 to position the tip as shown.

A cylindrical guide 66 is preferably provided in the opening 4 with a standard gate valve 68 being provided therein. The probe 6 may be moved from the exit side of valve 68 into the furnace by any suitable means. For example, means similar to that shown in the co-pending Kennedy application, Serial No. 89,165, filed February 14, 1961, may be used. In this arrangement the probe is mounted in any suitable manner on a carriage 72 having wheels 74 thereon which are supported by rail 76 for movement toward and away from the furnace. The ends of a chain 78 are attached to the top of the carriage 72. The chain 78 passes around an idler sprocket 80 arranged above and between the track 76 at the outer end thereof and a drive sprocket 82 arranged at the forward end of the track 76. A sprocket 84 supports the upper run of chain 78 intermediate the sprockets 80 and 82. The sprocket 82 is driven by a motor 86 through a gear reducer 88.

In operation, with the gate valve 68 closed the probe 6 will be in the position shown in FIGURE 1 and the carriage 72 will be in its remote position. When it is desired to obtain furnace gas analyses and/or temperatures the valve 68 is opened and the motor 86 actuated so that the carriage 72 is pulled forwardly by the chain 78 and the probe 6 will move into the furnace through the burden. Because of the arrangement and construction of the tip the probe will be tilted upwardly during its movement through the furnace burden. A sample of gas and a temperature reading may be taken at one position after which the probe is moved inwardly to other positions and gas samples analyzed and temperature readings taken at each position. Tests were made using a probe provided with a tip of the conventional symmetrical design and a similar probe provided with the tip of the present application in which the time required for the downward force to build up to the maximum on the probe was determined. These tests showed that the time required with applicant's tip was between 55 and 100% greater than that required for the symmetrical tip. Thus more time is available for obtaining gas samples and temperature readings.

Since the tip portion is more apt to be damaged than other parts of the probe and applicant's construction enables the tip to be readily replaced without the necessity of replacing the entire probe, there is a saving in maintenance cost.

FIGURE 3 shows another tip construction having the characteristics necessary for functioning according to the teachings of my invention. In this embodiment tip portion 90 includes a tube 91 having its forward end cut on an upper bias and a lower bias with a flat closure plate 92 extending downwardly and forwardly and a flat closure plate 93 extending upwardly and forwardly over the cut out portions with its lead end 94 offset upwardly from the longitudinal axis of the probe.

In FIGURE 4, tip portion 95 includes a tube 96 having its forward end cut on a bias and a cone 97 welded thereto.

In FIGURE 5, tip portion 98 includes a tube 99 having its forward end cut on a bias and a cone portion 100 welded thereto with the axis of the cone parallel to, but above the axis of the probe.

In each of the embodiments shown the lead end of the tip is offset upwardly from the longitudinal axis of the hollow body so that the advancing probe displaces more material in the downward direction than in the upward direction, this construction causing the probe to be tilted upwardly as it moves through the furnace burden.

While several embodiments of my invention have been shown and described, it will be apparent that other adaptations and modifications may be made without departing from the scope of the following claims.

I claim:

1. Apparatus for determining conditions within a blast furnace having a burden therein which comprises an elongated probe adapted to be inserted within said furnace, and means for moving said probe from a position at least partially out of said furnace through said burden to a position where the major portion of said probe is within said furnace; said probe having a hollow body terminating at its forward end in a tip, said tip having its lead end offset upwardly from the longitudinal axis of the hollow body so that the advancing probe displaces more material in the downward direction than in the upward direction, said probe having an opening through the wall thereof.

2. Apparatus according to claim 1 in which the tip is formed by having the forward end of said hollow body arranged on a bias with the upper side extending beyond the lower side, and a closure plate for said hollow body extending upwardly and forwardly over said bias.

3. Apparatus for determining conditions within a blast furnace having a burden therein which comprises an elongated probe adapted to be inserted within said furnace, and means for moving said probe from a position at least partially out of said furnace through said burden to a position where the major portion of said probe is within said furnace; said probe having a body portion, a tip portion, and means detachably connecting said portions, said body portion having a longitudinal opening therethrough and a thermocouple extending through said opening, said tip portion having a longitudinal opening therein for receiving the forward end of said thermocouple, said tip having its lead end offset upwardly from the longitudinal axis of the hollow body so that the advancing probe displaces more material in the downward direction than in the upward direction.

4. Apparatus for determining conditions within a blast furnace having a burden therein which comprises an elongated probe adapted to be inserted within said furnace, and means for moving said probe from a position at least partially out of said furnace through said burden to a position where the major portion of said probe is within said furnace; said probe having a body portion and a tip portion, said body portion including an outer tube, an internally threaded member secured to the inside of the forward end of said outer tube, an inner tube having an outside diameter less than the inside diameter of said outer tube secured to said threaded member within said outer tube and extending beyond the rear end of said outer tube, means for circulating cooling water between said inner and outer tubes, a thermocouple extending through said inner tube; said tip portion including a tube having the same diameter as the said outer tube, a tubular member secured to the inside of said last named tube, said tubular member having male threads thereon in engagement with the threads of said internally threaded member, said thermocouple extending through the opening in said tubular member, said tip having its lead end offset upwardly from the longitudinal axis of the hollow body so that the advancing probe displaces more material in the downward direction than the upward direction.

5. Apparatus for determining conditions within a blast furnace having a burden therein which comprises an elongated probe adapted to be inserted within said furnace, and means for moving said probe from a position at least partially out of said furnace through said burden to a position where the major portion of said probe is within said furnace; said probe having a body portion and a tip portion, said body portion including an outer tube, an internally threaded member secured to the inside of the forward end of said outer tube, an inner tube having an outside diameter less than the inside diameter of asid outer tube secured to said threaded member within said outer tube and extending beyond the rear end of said outer tube, means for circulating cooling water between said inner and outer tubes, a thermocouple extending through said inner tube; said tip portion including a tube having the same diameter as the said outer tube, a tubular member secured to the inside of said last named tube, said tubular member having male threads thereon in engagement with the threads of said internally threaded member, said thermocouple extending through the opening in said tubular member, the forward end of said last named tube being arranged on a bias with the upper side extending beyond the lower side, a closure plate for the forward end of said last named tube extending upwardly and forwardly, said last named tube having openings through the top and bottom thereof, and a filter within said last named tube.

6. Apparatus for determining conditions within a blast furnace having a burden therein which comprises an elongated probe adapted to be inserted within said furnace, and means for moving said probe from a position at least partially out of said furnace through said burden to a position where the major portion of said probe is within said furnace; said probe having a body portion and a tip portion, said body portion including an outer tube, an internally threaded member secured to the inside of the forward end of said outer tube, an intermediate tube having an outside diameter less than the inside diameter of said outer tube secured to said threaded member within said outer tube and extending beyond the rear end of said outer tube, a closure member extending between said outer and intermediate tubes at the rear end of said outer tube, said intermediate tube having an opening through its wall adjacent to said internally threaded member, an inner tube having an outside diameter less than the inside diameter of said intermediate tube secured to said threaded member within said intermediate tube and extending beyond the rear end of said intermediate tube, a closure member extending between said inner and intermediate tubes at the rear end of said intermediate tube, a T attached to the rear end of said inner tube, a thermocouple extending through said inner tube, a cooling water inlet to the space between said inner and intermediate tubes at the rear end thereof, and a cooling water outlet from the space between said outer and intermediate tubes at the rear end thereof; said tip portion including a tube having the same diameter as the said outer tube, a tubular member secured to the inside of said last named tube, said tubular member having male threads thereon in engagement with the threads of said internally threaded member, said thermocouple extending through the opening in said tubular member, the forward end of said last named tube being arranged on a bias with the upper side extending beyond the lower side, a closure plate for the forward end of said last named tube extending upwardly and forwardly, said last named tube having openings through the top and bottom thereof, and a filter within said last named tube.

References Cited in the file of this patent

UNITED STATES PATENTS

| | | |
|---|---|---|
| 3,084,553 | Cullinan et al. | Apr. 9, 1963 |
| 3,085,435 | Miscoe et al. | Apr. 16, 1963 |

FOREIGN PATENTS

| | | |
|---|---|---|
| 143,409 | U.S.S.R. | Mar. 3, 1961 |